United States Patent [19]
De Leo et al.

[11] 4,096,744
[45] Jun. 27, 1978

[54] PRESSURE SENSOR FOR DETERMINING AIRSPEED, ALTITUDE AND ANGLE OF ATTACK

[75] Inventors: Richard V. De Leo, Hopkins; Floyd W. Hagen, Eden Prairie, both of Minn.

[73] Assignee: Rosemount Inc., Eden Prairie, Minn.

[21] Appl. No.: 610,579

[22] Filed: Sep. 5, 1975

[51] Int. Cl.² ............................................. G01C 21/00
[52] U.S. Cl. ........................................ 73/180; 73/212
[58] Field of Search ............... 73/212, 182, 180, 178 R

[56] References Cited
U.S. PATENT DOCUMENTS

| | | | |
|---|---|---|---|
| 2,725,746 | 12/1955 | Young | 73/180 |
| 3,318,146 | 5/1967 | De Leo | 73/180 |
| 3,482,445 | 12/1969 | De Leo et al. | 73/212 |
| 3,585,859 | 6/1971 | De Leo et al. | 73/212 |
| 3,880,002 | 4/1975 | Gallington | 73/180 |
| 3,942,376 | 3/1976 | Gallington | 73/180 |

*Primary Examiner*—Donald O. Woodiel
*Attorney, Agent, or Firm*—Kinney, Lange, Westman and Fairbairn

[57] ABSTRACT

A strut or boom mounted probe having separate pressure sensing ports or sets of ports axially spaced on the side of the probe. The ports are located on the probe so that at a reference angle of attack, normally zero angle of attack, the static pressure conditions at both of the sensing port sets are at a known relationship. As the angle of attack varies from the reference angle, the sensed pressures at the port sets differ, with the difference increasing with increasing angle of attack. The sensor normally has a pitot pressure opening at its forward extremity, although a separate pitot pressure probe may be used if desired. A single probe is capable of providing pitot pressure, static pressure and a differential pressure signal proportional to angle of attack.

18 Claims, 9 Drawing Figures

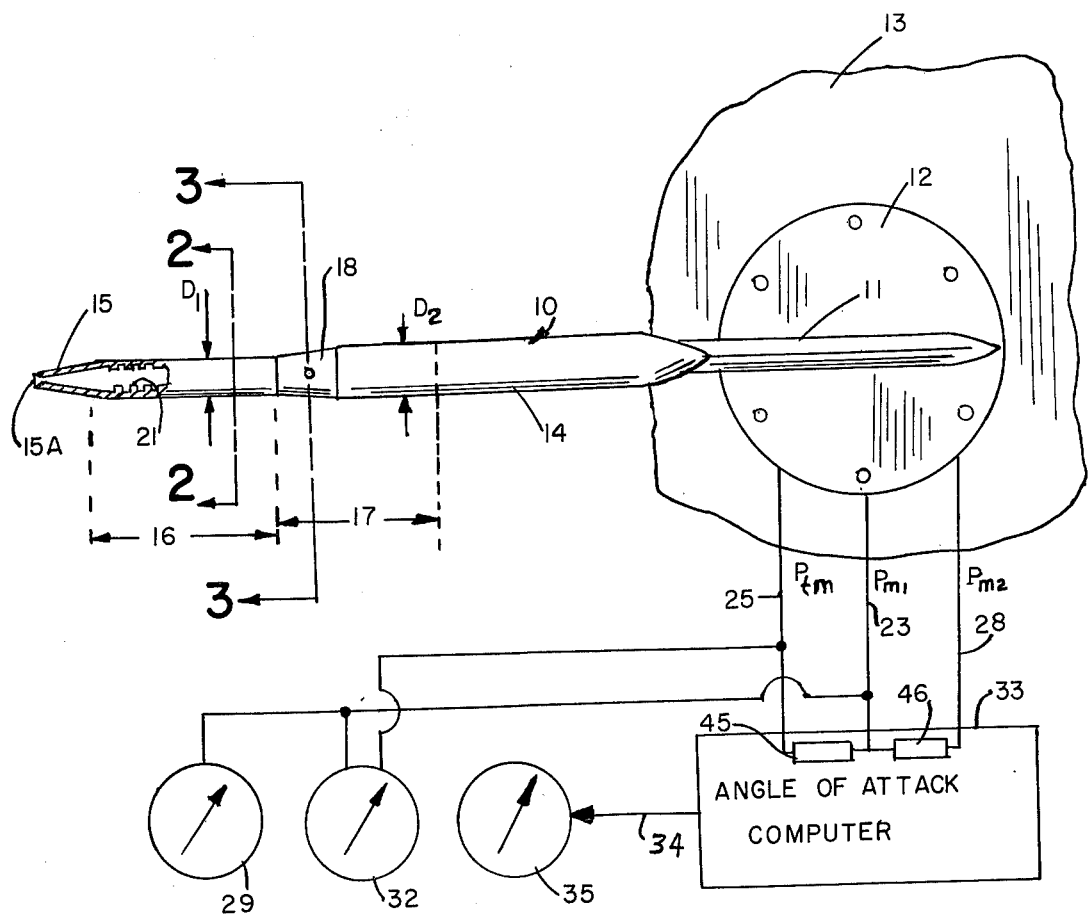
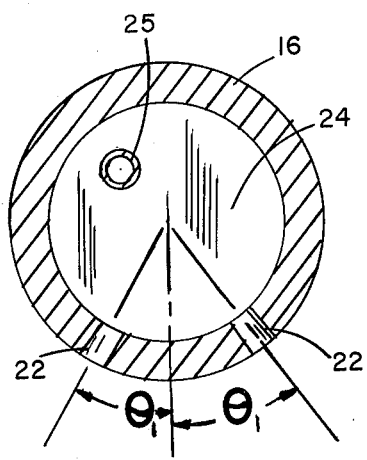
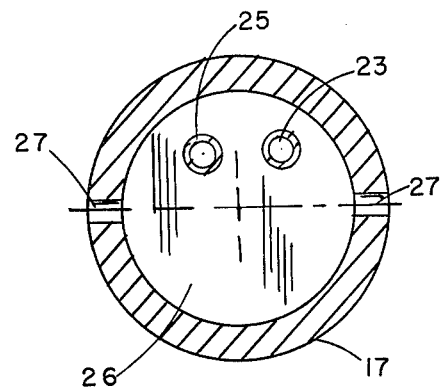

PRESSURE SENSOR FOR DETERMINING AIRSPEED, ALTITUDE AND ANGLE OF ATTACK

BACKGROUND OF THE INVENTION

1. Field of the Invention

The present invention relates to pressure measuring probes which provide multiple pressure readings from a single external strut mounted or boom mounted probe.

2. Prior Art

The advantage of having aerodynamically compensated static pressure sensing probes, as well as incorporating pitot sensing and dual static systems in the same probe has been known. Various devices which provide satisfactory results in many conditions have been advanced. For example, an aerodynamically compensated dual static probe is shown in U.S. Pat. No. 3,482,445. In that patent, the probe is provided with a discontinuity or surface irregularity that causes an alteration of the measured static pressure thereby compensating for other irregularities such as adjacent portions of the aircraft so that true dual compensated static sensing can be achieved by proper location of a pair of sets of ports on the probe.

In many applications it is necessary to measure local angle of attack on or ahead of the aircraft fuselage. In the present device, a second set of pressure ports are made on the side of the probe so that the pressure sensed will vary in a known relationship with respect to a first static pressure sensed at a first set of ports, and from this variation, the local angle of attack can be determined.

Both pitot-static tubes and angle of attack sensors have been used extensively in the past but generally each unit is installed at a different location thereby adding to the weight, drag and cost as well as the complexity of the installation.

Insofar as the location of the static pressure ports are concerned, U.S. Pat. No. 3,120,123 discloses a static pressure sensing probe which has ports located in various positions, including ports that are located at the sides of the probe and also an embodiment which shows static ports facing downwardly on opposite sides of the ventral central line. This configuration is shown in FIG. 15 of Pat. No. 3,120,123.

The ability to utilize differential pressure sensing ports on the hemispherical end of a sensing probe is disclosed in U.S. Pat. No. 3,318,146. The use of signals derived from such pressure sensing ports, by combining them in an air data computer, to provide angles of attack and sideslip is disclosed in that patent.

However, the present device permits the use of a slender probe for accomplishing the readings desired, which aids in minimizing drag, and also aids in simplifying the de-icing that is necessary.

SUMMARY OF THE INVENTION

The present invention relates to a sensing probe for use on aircraft, which may be small enough to meet design criteria from a physical standpoint, and yet can provide two separate sets of measuring ports that provide pressure measurements to obtain accurate static pressure and angle of attack readings. The ports are axially spaced and positioned in desired locations on the probe so that at a reference angle of attack they will be measuring the same static pressure or pressures at a known relation to each other. As the angle of attack either increases or decreases from the reference angle, the differential pressure sensed between the two port sets will change and this measured difference is used to determine the angle of attack. True static pressure can also be determined from these ports.

Additionally, the probe may be provided with a pitot pressure sensing port at its leading end in a known manner, to provide the pitot pressure reading directly with the same probe.

Each of the sets of pressure ports are located in a known relationship circumferentially around a separate diametral plane perpendicular to the axis of the probe, and the other of the sets of ports is spaced axially along the probe, and is not on the same diametral plane. However, by varying the pressure pattern along the probe as is now known, and positioning the static pressure ports in preselected locations, the second set of ports will be in a known relation to the primary static pressure sensing ports.

By using an angle of attack computer providing an output proportional to a known relationship between the differential pressure, static pressure and pitot pressure, the angle of attack can be provided directly.

BRIEF DESCRIPTION OF THE DRAWINGS

FIG. 1 is a typical side elevational view of a fuselage mounted probe including ports located in accordance with the present invention;

FIG. 2 is a sectional view taken as on line 2—2 in FIG. 1;

FIG. 3 is a sectional view taken as on line 3—3 in FIG. 1;

DESCRIPTION OF THE PREFERRED EMBODIMENTS

Figure 4:
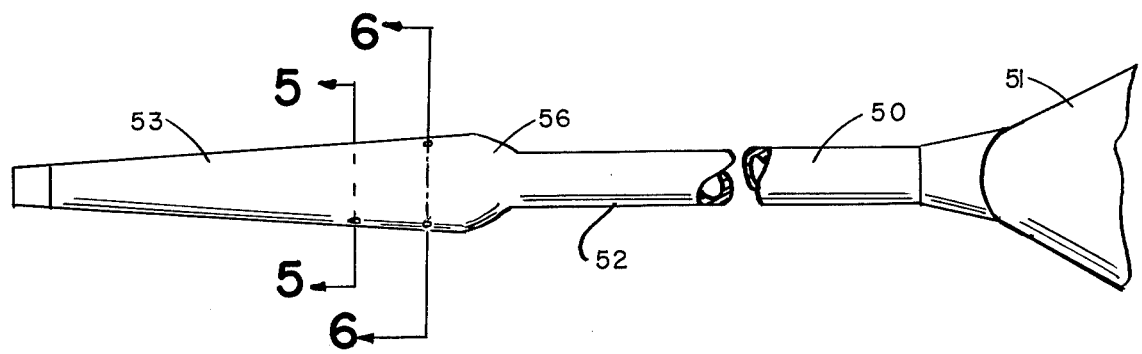
FIG. 4 is a side elevational view of a typical boom mounted probe including static pressure ports located in accordance with the present invention.

In FIG. 1, a strut mounted probe illustrated generally at 10 is of the short probe variety, having a support strut 11, and a mounting base 12 that is generally fastened onto the fuselage 13 of an aircraft. The probe 10 includes a barrel section 14 that has a longitudinal axis, oriented in a preselected relationship with respect to the fuselage 13 of the aircraft. As shown, the barrel has a forward end 15, a first region indicated generally at 16 that is cylindrical in cross-section and of diameter $D_1$, a second region indicated generally at 17 which includes a conical portion 18 joining the first region 16 and a cylindrical portion of diameter $D_2$ which is greater than $D_1$. The forward end 15 is also tapered and at the leading end, a pitot pressure port indicated at 15A is provided for sensing pitot pressure. Further, as shown, an electrical heater element indicated generally at 21 may be mounted on the interior of the probe for de-icing purposes.

The interior of the barrel 14 is divided into individual sections, and suitable pressure carrying tubes lead from each of the sections. Bulkheads divide the probe to provide pressure sensing chambers on the interior of the probe. As shown in FIG. 2, a bulkhead 24 forms the leading end of the first static pressure sensing chamber. A first set of static pressure sensing ports 22, which as shown are on opposite sides and at equal angle $\theta_1$ from the ventral longitudinal plane (on the lower side of the probe). The first ports are located in region 16 and provide pressure to a chamber of the probe. The pressure signal is carried through a suitable tube indicated generally at 23 to remote instruments. These instruments will be more fully explained subsequently. A pitot pressure sensing tube 25 extends through the bulkhead 24. Other bulkheads are used to provide a pressure sensing chamber for a set of ports 27 for example bulkhead 26 shown in FIG. 3.

The set of pressure sensing ports 27 is positioned in barrel section 18. As shown, ports 27 are diametrically opposed along a substantially horizontal plane. A line or tube 28 is used for carrying the second pressure sensed through the ports 27 to the remote instruments. Ports 27 are located in region 17.

As shown, the pressure sensed at ports 22,22 is normal static pressure provided to an altimeter 29 for altitude measurement. The pitot pressure supplied through line 25 is used in airspeed indication, and an airspeed indicator 32 is connected to this pitot pressure, and also to the line 23.

An angle of attack computer illustrated generally at 33, which is a ratio instrument giving an output along a line 34 to an angle of attack indicator 35, receives signals from the pitot pressure port 15A, and from both of the sets of pressure ports 22 and 27. The signals provided to the angle of attack computer may be electrical signals provided as functions of the measured pressures. Such electrical signals are provided as outputs of pressure sensors which deliver an electrical output as a function of pressure. These pressure sensors are well known and can form part of the angle of attack computer or they may be separate sensors used to provide electrical signals to other indicators or instruments.

The angle of attack computer is a ratio instrument well known in the art, and is programmed to provide outputs which are predetermined functions of the pressure measurements supplied to the computer, as will be further explained.

In relation to the device shown in FIG. 1, "$p_{tm}$" is the signal indicating the pitot pressure at port 15A, $p_{m1}$ is the signal indicating the pressure at the first set of ports 22, and $p_{m2}$ is the signal indicating the pressure at the second set of ports 27.

In FIG. 2, the angle $\theta_1$ is generally about $37\frac{1}{2}°$. This arrangement provides a static pressure output which is substantially invariant with aircraft angle of attack. The pressure sensed at ports 27,27 comprising the second set of ports $p_{m2}$ is equal to the pressure $p_{m1}$ sensed at the set of ports 22,22 when the angle of attack is zero or at some other selected reference angle. However, the static pressure $p_{m2}$ sensed at ports 27,27 changes with angle of attack. With the ports 27,27 positioned as shown, the pressure will decrease as angle of attack increases.

In dealing with sensed pressure quantities, a common term used is a normalized pressure function $(p_t - p_m)/q_c$.

This normalized pressure function is the pitot pressure minus the measured static pressure divided by the impact pressure, $q_c$. The quantity $q_c$ is the pitot pressure minus the static pressure. The $p_m$ designation means measured pressure and thus $p_{m1}$ and $p_{m2}$ are the measured pressures at port sets 22 and 27 respectively and $p_{tm}$ is the measured pitot pressure at port 15A. These designations are used in the curves of FIG. 7.

Figure 7:
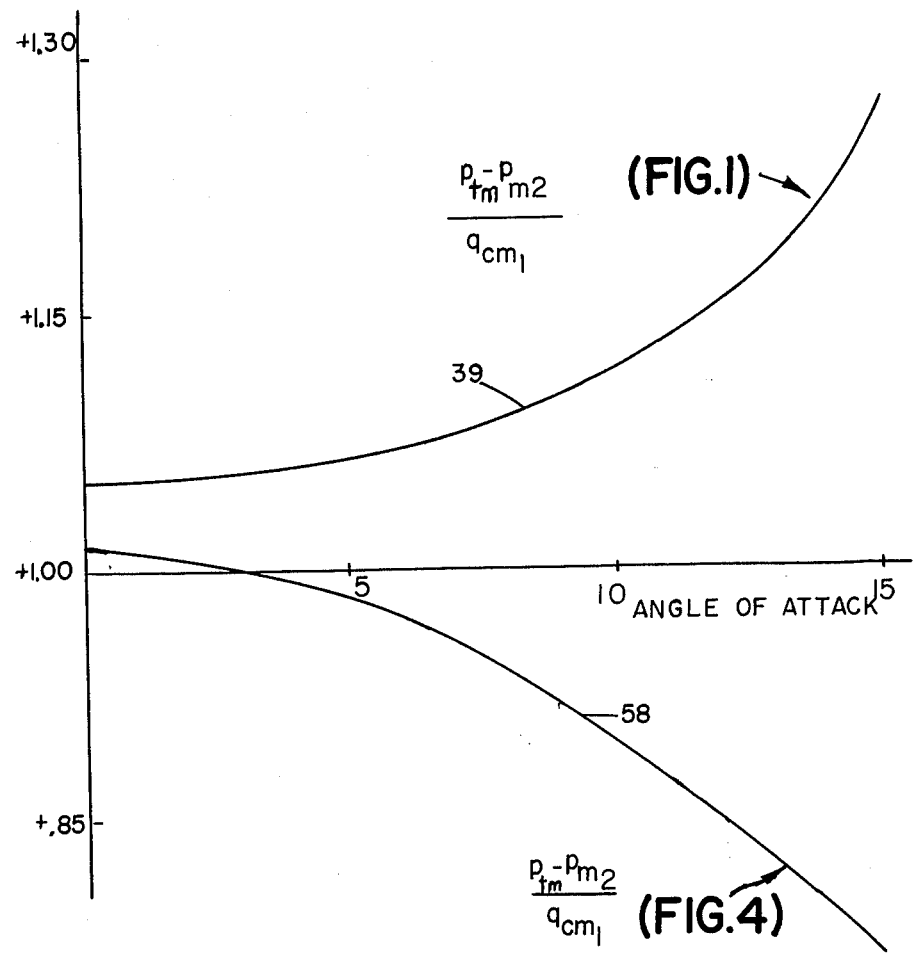
FIG. 7 is a graphical representation of output pressures sensed by a probe of the present invention as a function of aircraft angle of attack.

Likewise, $q_{cm1}$ as used in FIG. 7 is the measured pitot pressure minus the pressure measured at ports 22,22, that is $q_{cm1} = p_{tm} - p_{m1}$. In FIG. 7, the function using the pressure measured at ports 27, which is $p_{m2}$ in FIG. 1, increases with increasing angle of attack and is illustrated by the curve 39. This plot of $(p_{tm} - p_{m2})/q_{cm1}$ shows a continuously increasing positive change with angle of attack of the aircraft when in the arrangement of FIG. 1.

Figure 8:
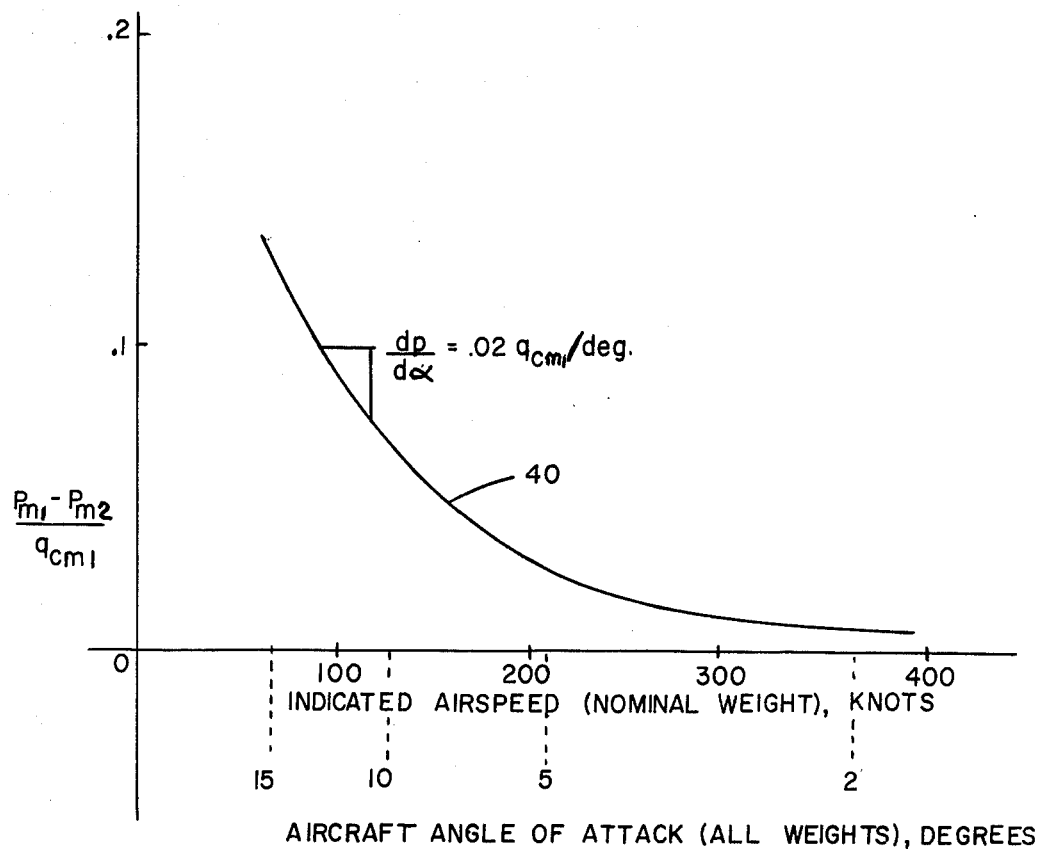
FIG. 8 is a graphical representation of the pressure ratio between two sets of static sensing ports normalized in accordance with known procedures plotted versus the aircraft angle of attack and airspeed.

FIG. 8 shows curve 40 which is a plot of $(p_{m1} - p_{m2})/q_{cm1}$ plotted versus indicated airspeed, and as a second plot, on the same figure, versus angle of attack. This ratio $(p_{m1} - p_{m2})/q_{cm1}$ is used by the aircraft angle of attack computer to provide an output proportional to angle of attack. In a critical region of the curve 40 shown in FIG. 8, that is in the region near stall, the sensitivity of the signal varies between 0.01 $q_{cm1}$ and 0.04 $q_{cm1}$ per degree, depending on the detailed design. Typically the pressures $p_{tm}$, $p_{m1}$ and $p_{m2}$ are fed into two differential pressure sensors schematically represented at 45 and 46 in FIG. 1 which give electrical outputs proportional to the desired differentials $p_{m1} - p_{m2}$ and $p_{tm} - p_{m1}$.

Referring now to FIG. 4, a nose mounted probe indicated generally at 50 is mounted onto the nose 51 of an aircraft, and as shown has a reduced barrel section 52, and a generally rearwardly increasing tapered forward section 53. A transition section 56 which ties the rear of the forward section 53 and the reduced section 52 together is also illustrated.

Figure 6:
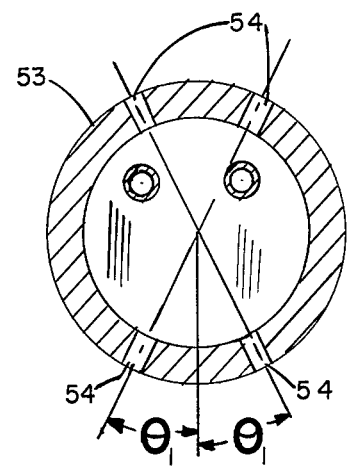
FIG. 6 is a sectional view taken as on line 6—6 in FIG. 4.

In this form of the invention, a pitot pressure port can be provided in the forward end of the probe and individual pressure sensing chambers for sensing two different pressures along the probe also are provided. The first, or primary static pressure sensing ports in this particular instance are rearwardly of the secondary sensing ports. As shown in FIG. 6, there are four (primary) static pressure sensing ports 54 located around the circumference of the probe, at equal angles $\theta_1$ from the vertical bisecting plane. $\theta_1$ in this case is generally equal to an angle in the range of 26°.

Figure 5:
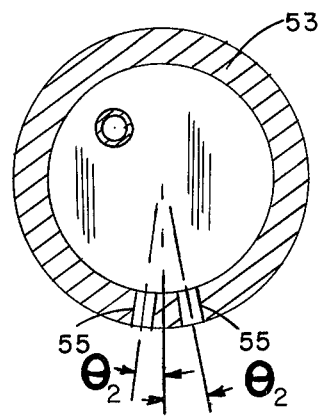
FIG. 5 is a sectional view taken as on line 5—5 in FIG. 4.

The secondary ports in this instance are located forwardly on the probe, and are shown at FIG. 5. Here, the ports 55 are at equal angles on opposite sides of the vertical bisecting plane and offset by an angle indicated at $\theta_2$. $\theta_2$ in this instance is in the range of 10°, so that the ports 55,55 are more nearly directly at the bottom of the probe.

At a reference angle of attack, for example zero, the pressure sensed at each of the sets of pressure ports will be substantially the same or may be at a desired known relationship to each other. In a positive angle of attack, however, the set of ports 55,55 will sense an increased pressure in relation to the primary set of ports 54, and as shown in curve 58 in FIG. 7 the pressure function $(p_{tm} - p_{m2})/q_{cm1}$ (FIG. 4) will follow the trend shown in curve 58. That is, the pressure function will decrease with increasing angle of attack. For the plot of curve 58, $q_{cm1}$ is $p_{tm}$ (measured pitot pressure) minus static pressure measured at ports 54, and $p_{m2}$ is the pressure measured at the second set of ports 55.

With the structure shown in the second form of the invention, the absolute values of the function $|(p_{m1} - p_{m2})/q_{cm1}|$ ($p_{m2}$ would be the sensed pressure at the set of ports 55, and $p_{m1}$ would be the sensed pressure at the set of ports 54) will be the same general shape as shown in FIG. 8 for curve 40, but the sign of $p_{m1} - p_{m2}$ would be negative for the form of the invention shown in FIGS. 4, 5 and 6 since $p_{m2}$ as shown would be larger then $p_{m1}$.

It should be noted that in the plot shown in FIG. 8, the output function is essentially linear and has a high slope in the region where angle of attack is most important, that is in the region of airspeed preceding stall. Commonly this linear region is from the stall speed to 1.4 times the stall speed for most aircraft. The system has therefore been provided with high sensitivity in the low speed region and lower sensitivity in the high speed region where angle of attack information is less important.

Figure 9:
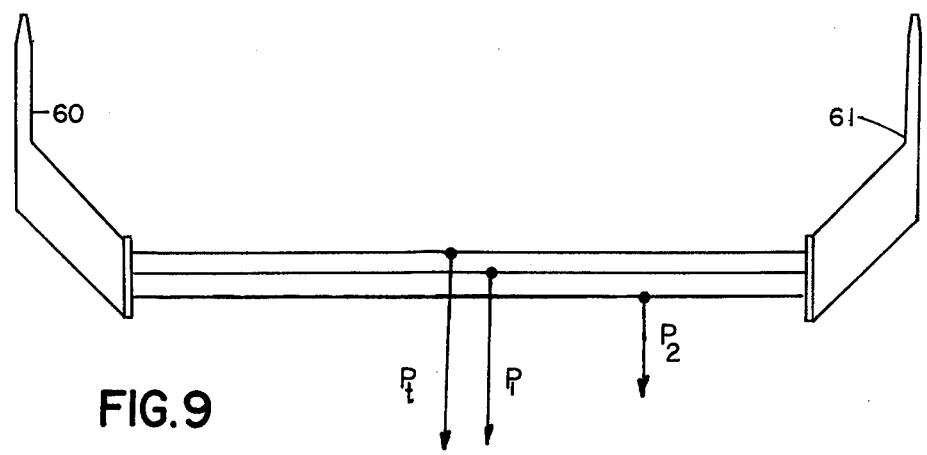
FIG. 9 is a schematic representation showing the use of probes on opposite sides of an aircraft fuselage to eliminate effects of side slip.

A further advantage of the system is that the pressures $p_{m1}$ and $p_{m2}$ can be manifolded from two identical probes 60 and 61 constructed as previously described with one on each of the right and left sides of the fuselage (FIG. 9) and the computed ratio is the average ratio or average angle of attack. This is important since for an aircraft fuselage at a combined angle of attack and sideslip, the local angle measured on either side of the fuselage will be altered by the sideslip. The local angle changes due to sideslip are nearly equal and of opposite sign such that the average reading from the two probes on opposite sides of the aircraft is the desired reading.

In a simplified system where a lift reserve signal would be sufficient (rather than angle of attack) the absolute value of the pressure differential $(p_{m1} - p_{m2})$ could be transmitted to a direct reading instrument as described in U.S. Pat. No. 3,470,740.

It is apparent that either the leading or trailing sets of ports could be the ports at which the sensed pressure changes the most with changes in angle of attack.

What is claimed is:

1. An air data sensing probe for use in fluid streams, comprising a barrel having a longitudinal axis, said barrel having a first leading end facing a preselected direction, and a second end spaced from said first end along said longitudinal axis, means to attach said second end of said barrel to an object, first pressure sensing port means formed in a first section of said barrel spaced from both ends thereof and being arranged to sense static pressure of fluid surrounding said barrel where there is relative motion between a fluid surrounding said barrel and said barrel, and second pressure sensing port means formed in said barrel to independently sense pressure at the surface of said barrel, and said second port means being positioned at a location spaced axially along said barrel from said first pressure sensing port means so that the pressures at the first and second pressure sensing port means change relative to each other when the longitudinal axis of said barrel deviates from a reference position, means to provide a pitot pressure signal due to relative motion between said barrel and the surrounding fluid, and means to combine the sensed pressures and pitot pressure signal to provide an indication of the angle of attack comprising the angle of the longitudinal axis of said barrel with respect to said reference position.

2. The combination as specified in claim 1 wherein said means to provide pitot pressure comprises a pitot port at the leading end of said barrel, and means sensing the pressure at said pitot port.

3. The combination as specified in claim 2 wherein said means to provide the angle of attack indication includes means to provide the impact pressure $q_{cm}$ comprising the pitot pressure minus the static pressure, and to provide a function conforming generally to the value $(p_{tm} - p_{m2})/q_{cm}$ where $p_{tm}$ is the pitot pressure, and $p_{m2}$ is the measured pressure of the second pressure sensing port means.

4. The combination as specified in claim 1 wherein said second port means comprise a plurality of apertures through the barrel which are symmetrically located on opposite sides of a plane passing through said axis of said probe barrel and in which the angle of attack is measured.

5. The combination as specified in claim 1 wherein said probe includes a wall section which changes in outside diameter from one position along said longitudinal axis to a second position along said longitudinal axis, and said second pressure sensing port means being located at a different diameter from the first port means.

6. The combination of claim 1 wherein said first pressure sensing port means are positioned to be substantially insensitive to pressure changes on said barrel resulting from changes of angle of said longitudinal axis with respect to said reference position.

7. An air data sensing probe including an elongated barrel having first and second ends, a longitudinal axis and an outer surface, said barrel being subjected to a relatively moving fluid stream generally along the longitudinal axis, first port means defined in said outer surface between said first and second ends, said first port means being substantially centered on a first common plane substantially perpendicular to said longitudinal axis, and second port means defined in said outer surface, said second port means being substantially centered on a second common plane perpendicular to the longitudinal axis of said probe and spaced in direction along said longitudinal axis from said first common plane and wherein the first and second port means are relatively positioned so that the pressure difference between said first and second port means varies with the angle between the probe and the fluid stream, and means to permit sensing the pressures at each of the first and second port means simultaneously and individually to provide indication of the change of angle of the probe relative to the fluid stream.

8. The probe of claim 7 and a third port defined in one end of said probe facing in direction to sense the pressure of the relatively moving fluid.

9. The probe of claim 7 wherein at least said second port means are positioned on the probe so that the pressure sensed thereby changes when the angle of said longitudinal axis changes with respect to a reference position relative to fluid flow.

10. The probe of claim 8 and means to provide a signal which is a function of the quantity $(p_{tm} - p_{m2})/q_{cm}$ where $p_{tm}$ is the pressure at said third port, $q_{cm}$ is the impact pressure of the fluid stream comprising $p_{tm}$ minus the static pressure at said probe, and $p_{m2}$ is the measured pressure at said second port means.

11. The probe of claim 7 and means providing a pitot pressure and means to provide a signal which is a function of the difference between the pressures at the first and second port means.

12. The probe of claim 11 wherein said last mentioned means provides a signal which is a function of $(p_{m1} -$ $p_{m2})/q_{cm1}$ where $p_{m1}$ and $p_{m2}$ are the measured pressures at the first and second port means respectively and $q_{cm1}$ is the impact pressure comprising the pitot pressure minus the measured static pressure at the probe.

13. A method of determining the change of angle of attack of an elongated probe with respect to a fluid stream, said probe having an outer wall and a longitudinal axis oriented generally parallel to the direction of relative flow of the fluid stream, said probe having a leading end, including the steps of sensing a first fluid pressure at one axial position along the probe, sensing a second fluid pressure at a second axially spaced position on the probe, both of said axial positions being spaced from the ends of the probe, and comparing functions of the first and second fluid pressures to determine change of angle of attack.

14. The method of claim 13 including the step of providing impact pressure comprising pitot pressure minus static pressure and dividing the differential between one sensed pressure and the other sensed pressure by the impact pressure to provide the angle of the probe with respect to a reference plane.

15. The method of claim 13 including the step of sensing one of the first or second fluid pressures at a specific location wherein the sensed pressure varies from static pressure and further sensing the pitot pressure due to relative movement of the probe and the fluid stream, providing a signal corresponding to impact pressure which is a function of pitot pressure minus static pressure, and providing a signal which is a function of the pitot pressure minus the sensed pressure at said specific location divided by the impact pressure to provide a signal proportional to the angle of the probe axis.

16. A method of determining the angle of attack of an elongated probe with respect to a fluid stream, said probe having an outer wall and a longitudinal axis oriented generally parallel to the direction of relative flow of the fluid stream, said probe having a leading end, including the steps of sensing a pitot pressure with the probe, providing a signal $q_c$ comprising the sensed pitot pressure minus the static pressure at the probe, sensing a second fluid pressure at a position on said probe axially spaced from the leading end of the probe where the pressure changes with changing angle of attack of the probe, and combining signals representing functions of the pitot pressure, second pressure and $q_c$ to determine angle of attack.

17. The method of claim 16 wherein the combining step includes the subtraction of the signal representing a function of the second pressure from the signal representing pitot pressure and dividing by $q_c$.

18. The method of claim 16 wherein the signal $q_c$ is obtained by subtracting a value of pressure measured at a position spaced axially from the position of measurement of the second fluid pressure, from the pitot pressure.

* * * * *